United States Patent [19]

Ona et al.

[11] 4,366,001

[45] Dec. 28, 1982

[54] ORGANO-FUNCTIONAL POLYSILOXANE COMPOSITIONS FOR FIBER-TREATING

[75] Inventors: Isao Ona, Sodeuramachi; Masaru Ozaki, Ichihara, both of Japan

[73] Assignee: Toray Silicone Co., Ltd., Tokyo, Japan

[21] Appl. No.: 279,926

[22] Filed: Jul. 2, 1981

[30] Foreign Application Priority Data

Jul. 7, 1980 [JP] Japan ................................. 55-92453

[51] Int. Cl.$^3$ ............................................. C04B 31/00
[52] U.S. Cl. ......................... 106/287.11; 106/287.12; 106/287.13; 106/287.14; 106/287.15; 106/287.16; 524/315; 524/354; 524/366; 524/375; 524/392; 524/465; 524/588; 524/490; 524/356
[58] Field of Search ..................... 106/287.11, 287.12, 106/287.13, 287.14, 287.15, 287.16; 260/29.2 M, 33.6 SB, 32.8 SB, 31.2 R, 33.8 SB; 524/588, 490, 366, 356, 315, 354, 465, 375, 392

[56] References Cited

U.S. PATENT DOCUMENTS

| | | | |
|---|---|---|---|
| 2,970,150 | 1/1961 | Bailey | 252/78.3 |
| 4,246,029 | 1/1981 | Sanders, Jr. | 106/287.13 |
| 4,247,592 | 1/1981 | Kalinowski | 428/266 |
| 4,273,584 | 6/1981 | D'Angelo et al. | 260/29.2 M |
| 4,311,737 | 1/1982 | Ishizaka et al. | 260/29.2 M |

*Primary Examiner*—Melyn I. Marquis
*Attorney, Agent, or Firm*—George A. Grindahl

[57] ABSTRACT

Fiber-treating compositions are disclosed which contain two types of organofunctional polysiloxanes, one bearing amino-functional organic radicals or carboxy-functional organic radicals or epoxy-functional radicals and the other bearing another type of organofunctional radicals selected from the same group. In addition, at least one of the organofunctional polysiloxanes bears one or more polyoxyalkylene radicals.

These compositions are useful for durably treating fibers to provide several benefits such as antistatic character, moisture/perspiration absorbability, stain resistance, pliability, smoothness, crease resistance and compression recovery.

8 Claims, No Drawings

ORGANO-FUNCTIONAL POLYSILOXANE COMPOSITIONS FOR FIBER-TREATING

BACKGROUND OF THE INVENTION

This invention concerns treatment agents for fibers. More precisely, this invention concerns organopolysiloxane compositions which can impart a durable antistatic character, moisture/perspiration absorbability, stain resistance, pliability, smoothness, crease resistance and compression recovery to fiber materials.

Conventionally, various types of treatment agents comprised or organopolysiloxanes or their compositions have been prepared or proposed in an attempt to impart pliability, smoothness, crease resistance and recoverability to fiber materials.

For example, the following treatment agents are known for imparting a durable pliability, crease resistance and recoverability: dimethylpolysiloxane oils or their emulsions for imparting pliability; treatment agents comprised of a methylhydrogenpolysiloxane, and dimethylpolysiloxane possessing hydroxyl groups at both ends of the molecule and a condensation-reaction catalyst; and treatment agents comprised of a methylhydrogenpolysiloxane, a vinyl-containing diorganopolysiloxane and an addition-reaction catalyst.

The following treatment agents are further examples: treatment agents comprised of an organopolysiloxane possessing at least two epoxy groups in the molecule and an organopolysiloxane possessing amino groups for smoothing organic synthetic fibers in Japanese Patent No. Sho 48(1973)-17514; treatment agents comprised of a diorganopolysiloxane possessing hydroxyl groups at both ends of the molecule, an organosilane possessing an amino group and an alkoxy group in the molecule and/or its partial hydrolysis condensate in Japanese Patent No. Sho 53(1978)-36079; treatment agents comprised of an aminoalkyltrialkoxysilane and an epoxy-containing organopolysiloxane in Japanese Patent No. Sho 53(1978)-19715 and No. Sho 53(1978)-19716; and diorganopolysiloxanes possessing triorganosiloxy groups at both ends of a molecule which possess two or more aminoalkyl groups at both ends of a molecule in Kokai Japanese Patent No. Sho 53(1978)-19716.

However, these conventional treatment agents have some drawbacks. For example, treatment agents containing a dimethylpolysiloxane as a primary agent do not exhibit satisfactory crease resistance and recoverability and the pliability and smoothness are not durable. Treatment agents containing alkoxysilanes as essential components have the drawbacks that the alkoxysilanes tend to undergo hydrolysis and the use life of the treatment bath is short after emulsification, and the hand of the treated materials is too stiff.

Treatment agents containing methylhydrogenpolysiloxane as an essential component also have the drawbacks that the curing reaction does not proceed satisfactorily unless a catalyst is used, that when a catalyst is used the life of the treatment bath is shortened and that a large amount of dangerous hydrogen gas which may cause fire or explosion is produced. Treatment agents containing an epoxy-containing-organopolysiloxane and an amino-containing organopolysiloxane as primary constituents have the drawbacks that static electricity is generated in large quantities due to friction, that oily stains are likely to be produced and that the moisture/perspiration absorbability is impaired when underwear is treated. In order to overcome these drawbacks, hydrophilic surfactants such as linolenic sulfate, Turkey red oil, polysiloxane/polyoxyalkylene copolymers and polyoxyethylene adducts of higher alcohols have been added to the treatment agents mentioned above. However, since these surfactants are readily soluble in water or the organic solvents used in dry cleaning and easily removed by repeated washing, there is the drawback that the durability of these treatment agents is poor.

BRIEF SUMMARY OF THE INVENTION

The present invention relates to fiber-treating compositions which comprise two organofunctional polysiloxane components and a carrier liquid, such as water and/or an organic solvent for the polysiloxane components. The two organofunctional polysiloxane components are selected from the group consisting of amino-functional polysiloxanes, epoxy-functional polysiloxanes and carboxy-functional polysiloxanes. Furthermore, at least one of the organofunctional polysiloxane components bears one or more polyoxyalkylene radicals per molecule.

When applied to fibers and crosslinked thereon the compositions of this invention overcome the drawbacks of conventional fiber treating compositions noted above. As a result, fiber treating agents are provided which are capable of imparting a durable antistatic character, moisture/perspiration absorbability, stain resistance, pliability, smoothness, crease resistance and compression recovery to fiber materials.

DETAILED DESCRIPTION OF THE INVENTION

The present invention relates to a composition for treating fibers, said composition comprising a carrier liquid and two organopolysiloxane components selected from the group consisting of

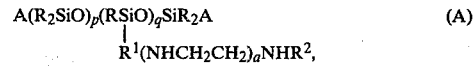  (A)

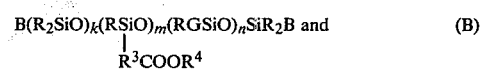  (B)

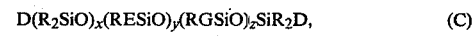  (C)

wherein, at each occurrence, A denotes R or $R^1(NHCH_2CH_2)_aNHR^2$, B denotes R or $R^3COOR^4$ or G, D denotes R or E or G, E denotes

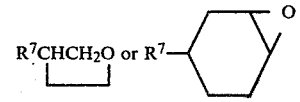

G denotes $R^5_bO(C_2H_4O)_c(C_3H_6O)_dR^6$, R denotes a substituted or unsubstituted monovalent hydrocarbon radical, $R^1$ denotes a divalent hydrocarbon radical, $R^2$ denotes a hydrogen atom or a monovalent hydrocarbon radical, $R^3$ denotes a divalent hydrocarbon radical, $R^4$ denotes a hydrogen atom or a monovalent hydrocarbon radical, $R^5$ denotes a divalent organic radical, $R^6$ denotes a hydrogen atom or a monovalent organic radical, $R^7$ denotes a divalent organic radical, a has a value of from 0 to 10, b has a value of 0 or 1, c has a value of from 0 to 50, d has a value of from 0 to 50, c+d has a value of from 2 to 100, k has a value of from 0 to 500, m has a value of from 0 to 100, n has a value of from 0 to 100, k+m+n has a value of from 10 to 500, p has a value equal to or greater than 0, q has a value equal to or greater than 0, p+q has a value of from 10 to 1000, x has a value of from 0 to 500, y has a value of from 0 to 100, z has a value of from 0 to 100 and x+y+z has a value of from 10 to 500, there being at least two $R^1(NHCH_2CH_2)_aNHR^2$ radicals per molecule of component (A), at least two $R^3COOR^4$ radicals and at least one G radical per molecule of component (B) and at least two E radicals and at least one G radical per molecule of component (C).

That is, the fiber treatment compositions specified in this invention are comprised of a combination of two types or organopolysiloxanes (A) and (B) or (A) and (C) or (B) and (C) as primary components. These organopolysiloxanes (A) or (B) or (C) alone can impart only nondurable antistatic character, moisture/perspiration absorbability, stain resistance, pliability, smoothness, crease resistance and compression recovery, but a combination of two types of these organopolysiloxanes can improve the effect mentioned above since a crosslinking reaction occurs between amino groups and carboxyl groups or between amino groups and epoxy groups or between carboxyl groups and epoxy groups. It was found that these effects are durable when this combination of two types of organopolysiloxanes is used.

However, since a catalyst is needed for the reaction between carboxylic acid esters and epoxy groups, the use of a catalyst in the treatment agents of this invention is not prohibited. "Durability" as used in this invention means that the treatment agents are satisfactorily durable after washing in water or dry cleaning and durable for a long time.

The component (A) organopolysiloxane is expressed by the above-specified general formula. In this formula, R represents substituted or unsubstituted monovalent hydrocarbon radicals, e.g., methyl, ethyl, propyl, dodecyl, vinyl, phenyl, beta-phenylethyl and 3,3,3-trifluoropropyl. Not all the R radicals in the same molecule are necessarily identical. Methyl radicals are the most common R radicals, but combinations of methyl radicals with other R radicals are also suitable.

$R^1$ in the $-R^1(NHCH_2CH_2)_aNHR^2$ radical represents divalent hydrocarbon radicals, e.g. alkylene groups such as $-CH_2-$, $-CH_2CH_2-$, $-CH_2CH_2CH_2-$, $-CH_2CH(CH_3)CH_2-$ and $-(CH_2)_4-$ and alkylenearylene radicals such as $-(CH_2)_2-C_6H_4-$. Among these radicals, propylene is the most common $R^1$ radical. $R^2$ represents a hydrogen atom or monovalent hydrocarbon radical, e.g., methyl, ethyl, propyl, hexyl and phenyl and a is an integer with a value of 0 to 10. A represents R radicals or $-R^1(NHCH_2CH_2)_aNHR^2$ radicals. If both A radicals are $-R^1(NHCH_2CH_2)_aNHR^2$ radicals, q can be 0, but this is not a desirable case. The value of p can also be 0; however, the value of p+q is 10 to 1000. If p+q is less than 10, the effect of imparting pliability and smoothness to the fiber materials is poor. On the other hand, if this value exceeds 1000, emulsification of the component becomes difficult.

The pliability and smoothness are imparted by the presence of the organopolysiloxane segment in the structure of component (A) and the imparted pliability and smoothness are durable due to the reaction of amino groups with carboxyl groups or carboxylic acid ester groups in component (B) or epoxy groups in component (C). Furthermore, a durable crease resistance and compression recovery are imparted by the use of component (A). In addition, a durable antistatic character, moisture/perspiration absorbability and stain resistance can be imparted by the introduction of the polyoxyalkylene groups in components (B) and (C). Thus, in order to carry out the crosslinking reaction between component (A) and component (B) or (C), at least two $-R^1(NHCH_2CH_2)_aNHR^2$ radicals must be present per molecule of component (A). Component (A) are well-known organopolysiloxanes and can be prepared by, for example, the method specified in U.S. Pat. No. 4,247,592.

The component (B) organopolysiloxanes are expressed by the above-specified general formula. In this formula, R represents substituted or unsubstituted monovalent hydrocarbon radicals, e.g., methyl, ethyl, propyl, dodecyl, vinyl, phenyl, beta-phenylethyl and 3,3,3-trifluoropropyl. All of the R radicals in the same molecule are not necessarily always identical. Methyl radicals are the most common R radicals, but combinations of methyl radicals with other R radicals are also suitable. $R^3$ in $-R^3-COOR^4$ represents divalent hydrocarbon radicals which are the same as those mentioned above for $R^1$. $R^4$ represents a hydrogen atom or monovalent hydrocarbon radicals which are the same as those mentioned above for $R^2$. G represents $-(R^5)_bO-(C_2H_4O)_c(C_3H_6O)_dR^6$ radicals where $R^5$ represents divalent organic radicals such as $C_1$ to $C_5$ alkylene radicals, optionally bonded to the oxygen atom by way of a $-C_6H_4-$ radical, a $-CO-$ radical or a $-NHCO-$ radical; $R^6$ represents a hydrogen atom or monovalent organic radicals, e.g., monovalent hydrocarbon radicals such as methyl, ethyl, propyl, dodecyl, cyclohexyl, phenyl and beta-phenylethyl and acyl and carbamoyl; b is 0 or 1 and c and d are 0 to 50 where c+d is 2 to 100. B is a radical selected from among R, $-R^3-COOR^4$ and G mentioned above and k is 0 to 500 and m and n are 0 to 100 where k+m+n is 10 to 500.

In order to carry out the crosslinking reaction between carboxyl groups or carboxylic acid ester groups in component (B) and the amino group in component (A) or epoxy groups in component (C), at least two $-R^3-COOR^4$ radicals must be present per molecule of component (B). The effects imparted by the crosslinking reaction are the same as those mentioned above. Moreover, at least one polyoxyalkylene (G) radical must be present per molecule in order to impart an antistatic character, moisture/perspiration absorbability and stain resistance to fiber materials treated therewith. At least two $-R^3-COOR^4$ radicals and at least one polyoxyalkylene group can be present in any segment of the molecular structure of the organopolysiloxane. If the value of c+d for the polyoxyalkylene radical is too small, the solubility or self-emulsifiability of the component is poor in an aqueous system and the effects on the antistatic character, moisture/perspiration absorbability and stain resistance are poor. If the value of c+d is too high, the polyoxyalkylene groups may be branched when they are prepared. Thus, the value of c+d preferably ranges from 5 to 50. The preferable ranges for the respective siloxane units are as follows: k is 10 to 500, m is 2 to 20 and n is 2 to 30 where k+m+n is 10 to 500. If the value of k+m+n is less than 10, the effect of imparting pliability and smoothness to a fiber material is poor. If this value exceeds 500, emulsification becomes difficult. Component (B) can be produced by the addition reaction specified in U.S. Pat. No. 2,970,150.

The component (C) organopolysiloxanes are expressed by the above-specified general formula. In this formula, R represents substituted or unsubstituted monovalent hydrocarbon radicals which are the same as those mentioned above for R.

Epoxy-containing monovalent organic radicals expressed by E are expressed by the general formula

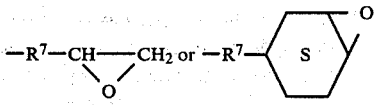

where $R^7$ represents divalent organic radicals, e.g., methylene, ethylene, propylene, phenylene, hydroxylic hydrocarbon radicals, chloroethylene, fluoroethylene, $-CH_2OCH_2CH_2CH_2-$, $-CH_2CH_2OCH_2CH_2-$,

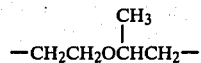

and $-CH_2OCH_2CH_2OCH_2CH_2-$. The polyoxyalkylene radicals expressed by G are the same as those mentioned in the explanation of component (B). D is a radical selected from among R, E and G. The value of x is 0 to 500 and y and z are 0 to 100 where $x+y+z$ is 10 to 500.

In order to carry out the crosslinking reaction between the epoxy groups in component (C) and amino groups in component (A) or the carboxyl groups or carboxylic acid ester groups in component (B), at least two epoxy-functional organic radicals must be present per molecule of component (C). As mentioned above, the reason for this is to make more durable the variety of effects imparted by using two types of organopolysiloxanes, e.g., antistatic character, moisture/perspiration absorbability, stain resistance, pliability, smoothness, crease resistance and compression recovery. Moreover, at least one polyoxyalkylene radical must be present per molecule in order to impart antistatic character, moisture/perspiration absorbability and stain resistance to fiber materials. These epoxy-containing organic radicals and polyoxyalkylene radicals can be present in any portion of the organopolysiloxane structure. Preferable ranges for the values of b, c and d in the polyoxyalkylene radicals are the same as those given for component (B) for the same reasons. As in the case of component (B), component (C) can be produced by the addition reaction specified in U.S. Pat. No. 2,970,150.

The relative amounts of the two organopolysiloxane components to be used in the compositions of this invention are not narrowly critical; however, an optimum amount of fiber-treating compositions will be durably fixed to fibers treated therewith if the two organopolysiloxane components are present in substantially equivalent amounts. By substantially equivalent amounts it is meant that the total number of organofunctional radicals (amino, carboxy or epoxy) in one organopolysiloxane component is equal to about 90 to 110% of the total number of organofunctional radicals (amino, carboxy or epoxy) in the other component.

A mixture of two types of organopolysiloxanes consisting of components (A) and (B) or components (A) and (C) or components (B) or (C) is dispersed in a carrier liquid such as water and/or an organic solvent, such as toluene, xylene, benzene, n-hexane, heptane, acetone, methyl ethyl ketone, methyl isobutyl ketone, ethyl acetate, butyl acetate, mineral terpene, perchloroethylene or chlorothene to prepare a treatment bath. When the carrier liquid comprises water the compositions can be emulsified using an appropriate emulsifier such as the sulfates of higher alcohols, alkylbenzensulfonates, higher alcohol polyoxyalkylene adducts, higher fatty acid polyoxyalkylene adducts, alkylphenol polyoxyalkylene adducts and higher fatty acid sorbitan esters. In the case of a combination of components (B) and (C), the composition can be directly self-emulsified. The prepared emulsions or solutions are then adhered on the fiber materials by methods such as spraying, roller and immersion methods.

Both components can be dissolved or emulsified separately and then a mixture of the two components is adhered on the fiber materials. Alternatively, a solution or emulsion of one of these components is adhered on the fiber materials and a solution or emulsion of the other component is subsequently adhered. In short, any treatment method can be applied by which both components are present together on the fiber material. In terms of homogeneity of the treatment effects, both components are preferably combined in advance and the resulting composition is applied on the fiber material.

Generally, 0.1 to 4 wt% of the combined organopolysiloxane components is adhered on the fiber material. Subsequently, the organic solvent or water is removed by standing at room temperature or blowing hot air or by a heat treatment. In a subsequent heat treatment, the crosslinking reaction between the two types of organopolysiloxanes proceeds smoothly and a durable antistatic character, moisture/perspiration absorability, stain resistance and especially stain resistance to oily stains, pliability, smoothness, crease resistance and compression recovery can be obtained. Treatment methods such as hot air blowing or a heat treatment are preferred over standing at room temperature since the productivity and durability are improved more.

If desirable, a crosslinking amount of an appropriate curing catalyst can be added, particularly as mentioned previously. In addition, other common additives such as antistatics, softening agents, crease-proofing agents, heat resistance-imparting agents and flame retardants can be added.

Fiber materials which can be treated with the compositions of this invention are natural fibers such as wool, silk, linen, cotton and asbestos; regenerated fibers such as rayon and acetate; synthetic fibers such as polyesters, polyamides, vinylon, polyacrylonitriles, polyethylenes, polypropylenes, and spandex; glass fibers; carbon fibers and silicon carbide. If the shape of the materials is considered, staples, filaments, tows, yarns, woven materials, knitted materials, unwoven fabrics and resin processed cloths can be treated. In particular, sheets of woven materials, knitted material, unwoven materials and quilting cotton may be treated continuously with a high efficiency.

The following examples are disclosed to illustrate, but not to limit, the present invention. Parts and percentages are by weight unless otherwise specified. Viscosity was measured at 25° C. Herein Me denotes the methyl radical.

EXAMPLE 1

A treatment solution was prepared by dissolving an amino-functional organopolysiloxane with formula (1)

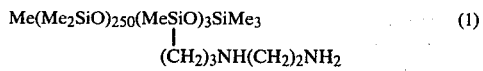

(1)

with a viscosity of 1100 centistokes (0.3 parts) and an organopolysiloxane containing both epoxy-functional organic radicals and polyoxyalkylene radicals with formula (2)

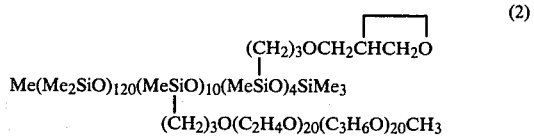

(2)

with a viscosity of 3500 centistokes (0.7 parts) in toluene (99 parts). No changes were observed in the viscosity of the treatment solution after standing for 3 days and the solution was stable.

A polyester/cotton (65/35) raincoat fabric was immersed in the treatment solution prepared above and the treated fabric was squeezed with a mangle roll to such a degree that the quantity of adhered organopolysiloxanes was 1% and dried in air. Subsequently, the fabric was heat treated at 150° C. for 5 minutes to complete the crosslinking reaction between the two types of organopolysiloxanes.

As comparative examples, a treatment solution was prepared by dissolving the amino-functional organopolysiloxane (1 part) with formula (1) in toluene (99 parts) and another treatment solution was prepared by dissolving the organopolysiloxane (1 part) possessing epoxy-functional organic radicals and polyoxyalkylene radicals as shown by formula (2) in toluene (99 parts). The raincoat fabric was treated with these treatment solutions under the same conditions as mentioned above. The antistatic character, moisture/perspiration absorbability and stain resistance were tested using these treated fabrics according to the tests mentioned below.

The antistatic character was examined by the following test. Each treated fabric and untreated fabric was immersed in perchloroethylene, the solution was agitated for 15 minutes and then the fabrics were dried. This treatment was used as a substitute process for dry cleaning. The treatment process was repeated twice. Moreover, the treated fabrics were cleaned in a 0.5% aqueous marcell soap solution under the vigorous conditions of an automatic reversing-agitation electric washing machine for 15 minutes and then rinsed with water and dried. This process was repeated twice. The cleaned untreated and treated fabrics and the uncleaned untreated and treated fabrics were allowed to stand at 20° C. under a humidity of 65% for one week. Subsequently, the friction potentials of these fabrics were determined with a Kyodai Kaken rotary static tester using a cotton fabric (Kanakin No. 3) as the friction control fabric. The data were determined at 60 seconds after rotation at a speed of 800 rpm. The residual organopolysiloxane content of the cleaned treated fabric was determined using a fluorescent X-ray apparatus (Rikagaku Denki Kogyo K.K.).

The moisture absorbability was examined by the following method. Each treated fabric and untreated fabric was cleaned in a 0.5% aqueous marcell soap solution under the vigorous conditions of an automatic reversing-agitation electric washing machine for 15 minutes and then rinsed with water and dried. This process was repeated five times. With respect to the cleaned treated and untreated fabrics and the uncleaned treated and untreated fabrics, the moisture absorption rate was determined by method A (drip method) according to 6.26 Moisture Absorbability of JIS-L-1096.

The stain resistance against oily stains was examined by the following method. ASTM No. 1 oil (300 g), coal tar (3 g), dry clay powder (5 g), portland cement (5 g) and sodium dodecylbenzenesulfonate (5 g) were thoroughly blended with a mortar to prepare an artificial contamination solution. The artifical contamination solution prepared above (5 ml) and a 0.5% aqueous marcell soap solution (100 ml) were placed in a 450 ml glass bottle. Treated and untreated fabrics (5×10 cm) were placed in respective glass bottles. After adding 10 steel balls to each glass bottle, the test fabrics were left immersed in the artificial contamination solution at 60° C. for 30 minutes for treatment. After lightly rinsing the fabrics with water and drying, the treated fabrics were washed in a 0.5% aqueous marcell soap solution for 10 minutes under the vigorous conditions of an automatic reversing-agitation electric washing machine. After rinsing with water and drying, the reflectance of the test fabrics at a wavelength of 550 mµ was determined with a reflectometer.

The test results are shown in Table I. As shown in the data, the fabrics treated using a composition of this invention exhibited superior antistatic character, moisture absorbability and stain resistance compared to those treated in the comparative examples and also exhibited an excellent durability of these characteristics.

TABLE I

| | Test Fabrics | | | |
| --- | --- | --- | --- | --- |
| | This Invention | | Comparative Example | |
| Test Items | Fabric treated with a treatment agent with formulas (1) and (2) | Untreated fabric | Fabric treated with a treatment agent with formula (1) alone | Fabric treated with a treatment agent with formula (2) alone |
| Friction static potential | | | | |
| before washing (V) | 930 | 1450 | 1810 | 730 |
| after washing (V) | 1020 | 1460 | 1670 | 1190 |
| Residual organopolysiloxane content (%) | 48 | — | 31 | 20 |
| Moisture absorbability | | | | |
| before washing (seconds) | 15.6 | 1.5 | ≧120 | 10.8 |
| after washing (seconds) | 12.2 | 1.8 | ≧120 | 10.9 |
| Reflectance at 550 mµ | 67 | 52 | 42 | 53 |

EXAMPLE 2

A treatment solution was prepared by dissolving an organopolysiloxane (viscosity: 8500 centistokes) possessing carboxyl-functional radicals and polyoxyalkylene radicals as expressed by formula (3)

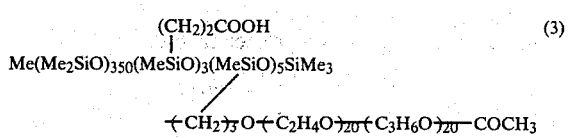

(3)

(1 part) and the amino-functional organopolysiloxane with formula (1) used in Example 1 (0.5 parts) in mineral terpene (98.5 parts).

A 100% cotton knit underwear has immersed in this treatment solution and excess solution was removed with a centrifugal drying machine to such a degree that the total quantity of adhered organopolysiloxanes was 1.5%. The treated fabric was dried by allowing it to stand at room temperature for 24 hours. Subsequently, the dried fabric was heat treated at 120° C. for 5 minutes.

As comparative examples, treatment solutions were prepared by dissolving the amino-functional organopolysiloxane with formula (1) (1.5 parts) in mineral terpene (98.5 parts) and by dissolving the organopolysiloxane possessing carboxyl-functional radicals and polyoxyalkylene radicals with formula (3) (1.5 parts) in mineral terpene (98.5 parts). 100% cotton knit underwear was treated under the same conditions as mentioned above.

Each treated fabric and untreated fabric was cleaned in a 0.5% aqueous marcell soap solution for 15 minutes under the vigorous conditions of an automatic reversing-agitation electric washing machine and then rinsed with water and dried. This process was repeated five times.

The cleaned treated and untreated fabrics and the uncleaned treated and untreated fabrics were used in the same tests as in Example 1 for friction static potential, residual organopolysiloxane content, moisture absorbability and reflectance at 550 m$\mu$. With respect to the cleaned treated and untreated fabrics, the hand of the fabrics was examined by functional test with the hands.

The test results are shown in Table II. It was confirmed that fabrics treated with the treatment agent of this invention exhibit excellent characteristics in terms of antistatic character, moisture absorbability, stain resistance and hand of the fabrics.

TABLE II

| | Test Fabrics | | | |
| --- | --- | --- | --- | --- |
| | This Invention | | Comparative Example | |
| Test Items | Fabric treated with a treatment agent with formulas (1) and (3) | Un- treated fabric | Fabric treated with a treatment agent with formula (1) alone | Fabric treated with a treatment agent with formula (3) alone |
| Friction static potential | | | | |
| before washing (V) | 620 | 530 | 960 | 510 |
| after washing (V) | 580 | 550 | 770 | 600 |
| Residual organo- polysiloxane content (%) | 46 | 0 | 36 | 8.7 |
| Moisture content | | | | |
| before washing (seconds) | 12.1 | 0.3 | ≧60 | 9.7 |
| after washing (seconds) | 9.0 | 0.3 | 38.7 | 9.5 |
| Reflectance at | 66 | 54 | 42 | 55 |

TABLE II-continued

| | Test Fabrics | | | |
| --- | --- | --- | --- | --- |
| | This Invention | | Comparative Example | |
| Test Items | Fabric treated with a treatment agent with formulas (1) and (3) | Un- treated fabric | Fabric treated with a treatment agent with formula (1) alone | Fabric treated with a treatment agent with formula (3) alone |
| 500 m$\mu$ (%) | | | | |
| Hand after washing | Both pliability and stretch- ability were quite excellent | Both pliability and stretch- ability were very poor | Both pliability and stretch- ability were quite excellent | Pliability was excellent, but stretch- ability was some- what poor |

EXAMPLE 3

The organopolysiloxane possessing epoxy-containing organic radicals and polyoxyalkylene groups with formula (2) as used in Example 1 (3 parts) was added to water (97 parts) and the mixture was stirred for about 20 minutes to obtain a homogeneous self-emulsifying solution (solution A). Separately, the organopolysiloxane possessing carboxyl groups and polyoxyalkylene groups with formula (3) as used in Example 2 (3 parts), a nonylphenyl polyoxyethylene adduct type (10 mol%) nonionic surfactant (1 part), dodecylphenol polyoxyethylene adduct type (40 mol%) nonionic surfactant (1 part) and water (95 parts) were mixed and stirred for about 20 minutes to obtain a homogeneous emulsion (solution B). Solution A and Solution B were combined at a 1:1 ratio by weight. Ammonium dihydrogen phosphate (0.3 parts) as catalyst was added to the mixed solution prepared as above (100 parts) to prepare a treatment solution.

A polyester/cotton (65/35) white broadcloth was immersed in the treatment solution prepared above and then squeezed with a mangle roll to such a degree that the quantity of adhered organopolysiloxanes was 1.5%. Subsequently, the fabric was dried at 110° C. for 7 minutes and hot cured by heating at 150° C. for 5 minutes.

As comparative examples, the broadcloth was treated with solution A or solubion B alone containing the specified catalyst under the same conditions.

The moisture absorbability and stain resistance to the artificial contamination solution were examined under the same conditions as mentioned in Example 1 with respect to each treated fabric.

The test results are shown in Table III.

TABLE III

| | Test Items | |
| --- | --- | --- |
| Test Fabrics | Stain resistance, reflectance at 550 m$\mu$ (%) | Moisture absorbability (seconds) |
| Fabric treated with a mixed solution of solutions A and B (This Invention) | 77 | 6.7 |
| Fabric treated with solution A (Comparative Example) | 62 | 8.5 |

TABLE III-continued

| | Test Items | |
|---|---|---|
| Test Fabrics | Stain resistance, reflectance at 550 mµ (%) | Moisture absorbability (seconds) |
| Fabric treated with solution B (Comparative Example) | 58 | 7.6 |

That which is claimed is:

1. A composition for treating fibers, said composition comprising a carrier liquid and two organopolysiloxane components selected from the group consisting of $$A(R_2SiO)_p(RSiO)_qSiR_2A \quad\quad (A)$$
$$| $$
$$R^1(NHCH_2CH_2)_aNHR^2,$$

$$B(R_2SiO)_k(RSiO)_m(RGSiO)_nSiR_2B \text{ and} \quad (B)$$
$$|$$
$$R^3COOR^4$$

$$D(R_2SiO)_x(RESiO)_y(RGSiO)_zSiR_2D \quad\quad (C)$$

wherein, at each occurrence,
A denotes R or $R^1(NHCH_2CH_2)_aNHR^2$,
B denotes R or $R^3COOR^4$ or G,
D denotes R or E or G,
E denotes

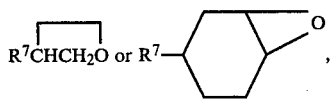

G denotes $R^5_bO(C_2H_4O)_c(C_3H_6O)_dR^6$,
R denotes a substituted or unsubstituted monovalent hydrocarbon radical,
$R^1$ denotes a divalent hydrocarbon radical,
$R^2$ denotes a hydrogen atom or a monovalent hydrocarbon radical,
$R^3$ denotes a divalent hydrocarbon radical,
$R^4$ denotes a hydrogen atom or a monovalent hydrocarbon radical,
$R^5$ denotes a divalent organic radical,
$R^6$ denotes a hydrogen atom or a monovalent organic radical,
$R^7$ denotes a divalent organic radical,
a has a value of from 0 to 10,
b has a value of 0 or 1,
c has a value of from 0 to 50,
d has a value of from 0 to 50,
c+d has a value of from 2 to 100,
k has a value of from 0 to 500,
m has a value of from 0 to 100,
n has a value of from 0 to 100,
k+m+n has a value of from 10 to 500,
p has a value equal to or greater than 0,
q has a value equal to or greater than 0,
p+q has a value of from 10 to 1000,
x has a value of from 0 to 500,
y has a value of from 0 to 100,
z has a value of from 0 to 100 and
x+y+z has a value of from 10 to 500,
there being at least two $R^1(NHCH_2CH_2)_aNHR^2$ radicals per molecule of component (A), at least two $R^3COOR^4$ radicals and at least one G radical per molecule of component (B) and at least two E radicals and at least one G radical per molecule of component (C).

2. A composition according to claim 1 wherein component (A) has the formula

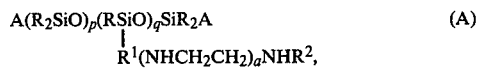

component (B) has the formula

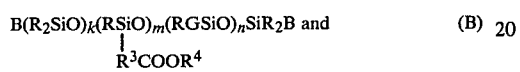

and component (C) has the formula

3. A composition according to claim 2 wherein the two organopolysiloxane components are component (A) and component (B).

4. A composition according to claim 2 wherein the two organopolysiloxane components are component (A) and component (C).

5. A composition according to claim 2 wherein the two organopolysiloxane components are component (B) and component (C).

6. A composition according to claims 1, 2, 3 4 or 5 further comprising a crosslinking amount of a crosslinking catalyst.

7. A composition according to claims 1, 2, 3, 4 or 5 wherein the two organopolysiloxane components are present in substantially equivalent amounts.

8. A composition according to claim 7 further comprising a crosslinking amount of a crosslinking catalyst.

* * * * *